United States Patent
Tan et al.

(10) Patent No.: US 6,628,716 B1
(45) Date of Patent: Sep. 30, 2003

(54) HARDWARE EFFICIENT WAVELET-BASED VIDEO COMPRESSION SCHEME

(75) Inventors: Yap-Peng Tan, Chandler, AZ (US); Tinku Acharya, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/342,863

(22) Filed: Jun. 29, 1999

(51) Int. Cl.[7] .................................................. H04N 7/12
(52) U.S. Cl. .................................................. 375/240.19
(58) Field of Search ........................ 375/240.18, 240.19, 375/240.07, 240.11, 240.13; 348/297.1, 298.1, 403.1, 404.1, 419.1; 382/240, 248

(56) References Cited

U.S. PATENT DOCUMENTS

| | | | | |
|---|---|---|---|---|
| 5,412,741 A | * | 5/1995 | Shapiro ........................ 382/232 |
| 5,495,292 A | * | 2/1996 | Zhang et al. ............. 348/407.1 |
| 5,737,448 A | * | 4/1998 | Gardos ........................ 382/240 |
| 5,764,805 A | * | 6/1998 | Martucci et al. ............. 382/238 |
| 6,075,875 A | * | 6/2000 | Gu .............................. 382/107 |

OTHER PUBLICATIONS

Marpe et al., "Very low bitrate video coding using wavelet based techniques", IEEE Trans. on Circuits and Systems for Video Technology, vol. 9, Iss. 1, pp. 85–94, Feb. 1999.*

* cited by examiner

Primary Examiner—Vu Le
(74) Attorney, Agent, or Firm—Blakely, Sokoloff, Taylor & Zafman LLP

(57) ABSTRACT

A method including intra-frame coding a first sequence of video data using Discrete Wavelet Transform; and inter-frame coding a second sequence of video data using Discrete Wavelet Transforms, the second sequence of data interspersed with the first sequence.

31 Claims, 4 Drawing Sheets

HARDWARE EFFICIENT WAVELET-BASED VIDEO COMPRESSION SCHEME

FIELD OF THE INVENTION

The invention relates generally to image processing and computer graphics. More specifically, the invention relates to compression of motion video utilizing wavelet transforms.

BACKGROUND

One important aspect of imaging is the transmission and encoding of image sequences (frames) for video which tries to its show time and space motion of a scene. Motion video compression techniques seek to reduce the bit rate required for storing or transmitting video while maintaining a certain level of acceptable video quality (as it is perceived). Most video sequences contain some amount of spatial redundancy within the same frame (intra-frame) or temporal redundancy between frames (inter-frame). By removing these redundancies, compression of data is achieved while distinguishing image features are retained. Intra-frame spatial redundacies are removed using transform coding similar to that used for compressing still images such as Discrete Cosine Transform (DCT). For removing temporal redundancy, techniques such as motion estimation and compensation are employed. FIG. 1 shows one such conventional video compression scheme widely used in existing video compression standards such as MPEG (Motion Picture Experts Group).

The encoder of FIG. 1 takes a current frame $I_N$ and subtracts it from a previous predicted frame $I'_{N-1}$ which is fed back. The difference frame D is transform coded (block 110) to remove intra-frame redundancy and then subjected to quantization (block 120), which is the process of mapping a values spanning one range to another range with fewer members. For instance, linear quantization might simply divide any value in the original data set by 2, rounded to the closest value, thus reducing the range of values from K to K/2. The quantized and transform coded data is then subjected to an entropy encoder (block 130). During quantization, there may have been errors introduced into the image (which also provide for compression). To reduce the propagation of this error, a decoder (composed of inverse quantization) (block 125) and inverse transform coding (block 135) is used to recover a close approximation of the current frame. This approximation $A_{N-1}$ is added to the predicted frame generated by the previous cycle $I_{N-1}$, which is held in a frame buffer (block 140). The error recovered data $I'_{N-1}$ is sent to the inter-frame predictor (block 150) which employs motion estimation and compensation to output a predicted frame $I_N$.

Such compression techniques are suitable for broadcasting applications, where the encoder can be dedicated and expensive hardware which relies on many low cost decoders on the receive end to extract the video. While good video quality is attainable from such an approach, it is not the most suitable for other applications. Where both encoding and decoding need to be low cost and more real-time, such as in personal computer video-conferencing, video phones and video cameras, the architecture of FIG. 1 is cost prohibitive and may not yield fast throughput demanded of a real-time system.

SUMMARY OF THE INVENTION

A method including intra-frame coding a first sequence of video data using Discrete Wavelet Transforms; and inter-frame coding a second sequence of video data using Discrete Wavelet Transforms, the second sequence of data interspersed with the first sequence.

BRIEF DESCRIPTION OF THE DRAWINGS

The objects, features and advantages of the method and apparatus for the present invention will be apparent from the following description in which.

DETAILED DESCRIPTION

Referring to the figures, exemplary embodiments of the invention will now be described. The exemplary embodiments are provided to illustrate aspects of the invention and should not be construed as limiting the scope-of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
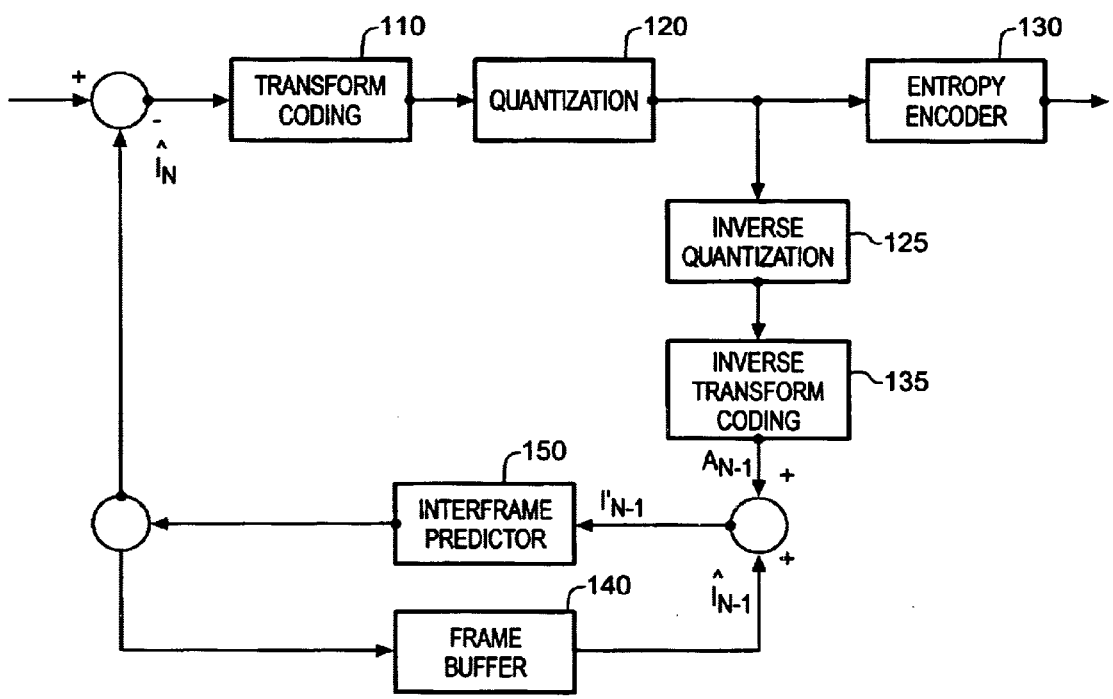
FIG. 1 illustrates a conventional video encoder
Figure 2:
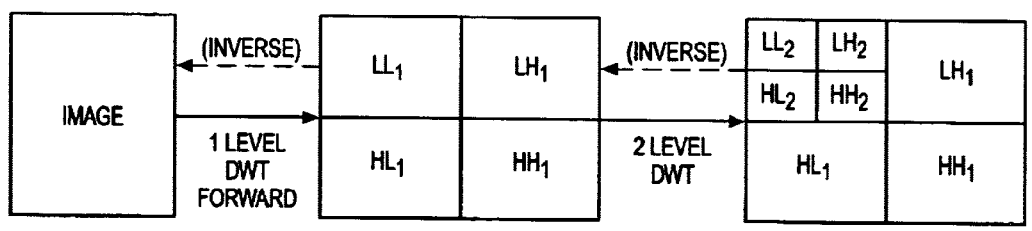
FIG. 2 illustrates the sub-band(s) resulting from a forward DWT operation upon an image.

In one embodiment, video compression is achieved using DWT (Discrete Wavelet Transform) in conjunction with entropy encoding. FIG. 2 illustrates the sub-band(s) resulting from a forward DWT operation upon an image. The DWT is a "discrete" algorithm based upon Wavelet theory which utilizes one or more "basis" functions that can be used to analyze a signal. DWT is well suited to representing edge features in images since Wavelets by nature are periodic and often jagged. The DWT approximates an input signal by discrete samples of a full continuous wavelet. Thus, with these discrete sample points, the DWT can be thought of as also being a filtering operation with well-defined coefficients. Unlike the Fourier transforms or averaging filters, the Wavelet coefficients can be selected to suit particularly the application, or type of input signal. The DWT chosen in at least one embodiment of the invention for image scaling is known as the 9–7 bi-orthogonal spline filters DWT. Where an imaging device or camera already utilizes a DWT for image compression, an inverse DWT can easily be implemented in the same device with little additional overhead and cost. One peculiar feature of DWT is its ability to preserve spatial and frequency information of frames.

The essence of what is known commonly as a two-dimensional DWT is to decompose an input signal into four frequency (frequency refers to the high-pass (H) or low-pass (L) nature of the filtering) sub-bands. The two-dimensional DWT creates four sub-bands, LL, LH, HL and HH, with the number of data values in each one-quarter of the input data. The DWT is multi-resolution technique such that the result data (wavelet coefficients) from one iteration of the DWT may be subjected to another DWT iteration. Each "level" of resolution is obtained by applying the DWT upon the "LL" sub-band generated by the previous level DWT. This is possible because the LL sub-band contains almost all essential image features and can be considered a one-quarter scaled version of the previous level LL sub-band (or the original full image in a one-level DWT). With this capability of the DWT, each sub-band can further be divided into smaller and smaller sub-bands as is desired.

Each DWT resolution level k has 4 sub-bands, $LL_k$, $HL_k$, $LH_k$ and $HH_k$. The first level of DWT resolution is obtained by performing the DWT upon the entire original image, while further DWT resolution is obtained by performing the DWT on the LL sub-band generated by the previous level k-1. The $LL_k$ sub-band contains enough image information to substantially reconstruct a scaled version of the image. The $LH_k$, $HL_k$ and $HH_k$ sub-bands contain high-frequency noise and edge information which is less visually critical than that resolved into and represented in the $LL_k$ sub-band.

In general, level K sub-band(s) have the following properties (if K=1, $LL_0$ refers to the original image):

$LL_k$ —contains a one-quarter scaled version of the $LL_k$—1 sub-band.

$LH_k$—contains noise and horizontal edge information from the $LL_k$-1 sub-band image.

$HL_k$—contains noise and vertical edge information from the $LL_k$-1 sub-band image.

$HH_k$—contains noise and high-frequency information from the $LL_k$-1 sub-band image.

The property of the DWT which allows most information to be preserved in the $LL_k$ sub-band can be exploited in performing up-sampling of an image. The DWT is a unitary transformation technique for multi-resolution hierarchical decomposition which permits for an input signal to be recovered with little loss by performing an inverse of the DWT. The coefficients representing the "forward" DWT described above have a symmetric relationship with coefficients for the inverse DWT. This is based upon the premise that an inverse DWT (IDWT), when applied to the four sub-bands generated at any level will result in the recovery of the LL sub-band of the higher level from which it was resolved, or in the case of level 1 sub-bands will result in recovery of the original image. The preservation of spatial and frequency information allow the quantized wavelet, coefficients (i.e. results of applying the DWT) of a previous frame to directly be used as a previous predicted frame on the next cycle, without motion estimation/compensation.

Figure 3:
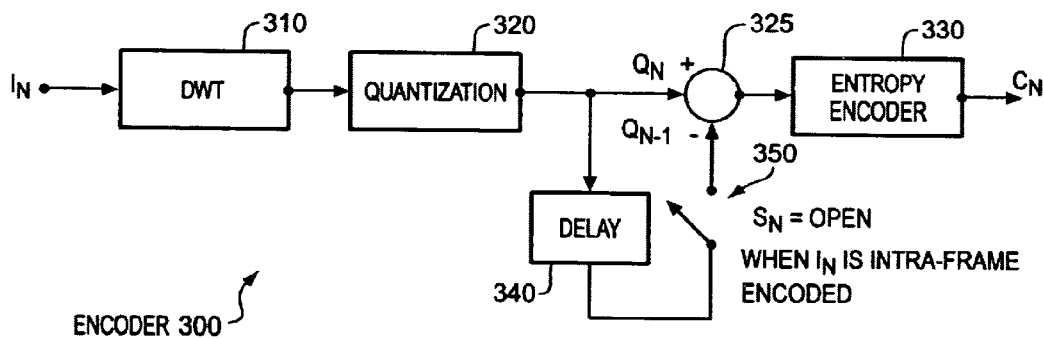
FIG. 3 illustrates a video encoder according to at least one embodiment of the invention.

FIG. 3 is a block diagram of video encoding according to at least one embodiment of the invention.

The encoder 300 of FIG. 3 compresses a sequence of individual image frames $I_N$ that constitute a stream of motion video. In accordance with block 310, an input frame $I_N$ is first subjected to a two-dimensional Discrete Wavelet Transform (DWT), as described above with reference to FIG. 2. The DWT result data (i.e. coefficients) are then subjected to quantization (block 320) yielding a set of quantized data $Q_N$. As described earlier, since the DWT preserves spatial and frequency information when transforming a video frame $I_N$, the quantized wavelet coefficient data set $Q_{N-1}$ of a previous frame may be used as the predicted frame (as transformed into the quantized wavelet space). When inter-frame (between frames) coding is required, quantized data sets $Q_N$ and $Q_{N-1}$ are differenced. This avoids the need for a motion estimation and compensation based prediction scheme as would be used in MPEG or similar encoding. Thus, the encoder 300 can perform both intra-frame coding and inter-frame coding without any significant added hardware/software. The dual modality is controlled/implemented by a switching signal $S_N$ 350 and a delay element 340. When a quantized wavelet data set is to be intra-frame encoded, $S_N$ 350 is open such that $Q_N$ passes directly to an entropy encoder 330. Entropy encoder performs for example Huffman coding on the data set $Q_N$ when intra-frame coding.

When a frame $I_N$ is to be inter-frame coded, a predicted frame is differenced with the current frame and the difference (residue) is then entropy encoded. By encoding the difference between frames, rather than the frame itself, in most cases, the encoded data is smaller in size than a full frame. By subtracting the current and predicted frames in the quantized wavelet domain, no motion estimator or compensator is required. In the wavelet domain, the previous wavelet transformed frame can be used as a predictor of the next frame(s) since it retains a substantial amount of temporal and frequency information. When inter-frame coding is desired, switching signal $S_N$ 350 is closed, delay element 340 is connected and sends through the previous quantized wavelet data set $Q_{N-1}$ to a subtractor node 325. The resulting difference $Q_N - Q_{N-1}$ from the node 325 is then entropy encoded by encoder 330. By controlling the switching signal $S_N$ 350, encoder 300 can intra-frame or inter-frame code. To summarize, if E(x) represents the entropy encoded result data of a set x and $Q_K$ represents quantized and wavelet compressed data of a frame k, then $C_N$ the compressed data output at the encoder is:

Intra-frame coding: $C_N = E(Q_N)$

Inter-frame coding: $C_N = E(Q_N - Q_{N-1})$

Key Frame Selection

In the encoder 300 of FIG. 3, if the very first frame in a video sequence is intra-frame coded and all remaining frames are inter-frame (differencing) coded, then a single key frame is selected. It may be desirable to have at regular intervals an intra-frame coded frame followed by a certain number of inter-frame coded frames. This allows an entry point into any part of the video sequence without having to start decoding the very first frame, since the closest intra-coded frame to the desired entry point may be used as the initial decode starting frame.

Selecting more than one key frames at regular or irregular intervals permits optimization of the encoding process. Inter-frame coding yields-more optimal results (i.e. better compression with minimal loss of quality) where the similarity in content between frames is greater. As described above with respect to FIG. 2, the LL sub-band of a wavelet transformed image is essentially a scaled version of the original pre-transform image. Thus, the content similarity between two successive frames may conveniently be measured by subtracting the LL sub-band of two consecutive frames. If the content similarity as measured by the LL sub-band differencing falls above a certain threshold, then the current frame is inter-frame coded. Otherwise, it is intra-frame coded. The measuring of content similarity can be implemented in the FIG. 3 apparatus which already has subtraction functionality. The choosing of intra-frame or inter-frame coding according to content similarity may provide highly efficient and better compression. Based on this choice, the signaling switch $S_N$ 350 can be opened or closed as described above.

Rate Control

The bit rate, which is the number of bits in a compressed data set $C_N$ output by encoder 300, varies from frame-to-frame and is greatly dependent on the content of the scene encompassed by the frame. For several reasons, such as bandwidth and/or memory availability, it may be desirable to control the bit rate such that it falls in a certain bound. Controlling the bit rate can be achieved in several ways.

As described above, the compression ratio can be improved by adjusting the number of intra-frame coded frames. Thus, when the bit rate is too high, reducing the number of intra-frame coded frames may lower the bit rate. Alternatively, the bit rate may be adjusted by altering the amount of quantization. As described above, quantization, which is the process of mapping a data set to fall within a smaller range of values, can greatly affect the compression ratio. One form of quantization, called uniform scalar quantization, merely scales each data point in the set by a selected factor. For instance, if the scaling factor were 2, each value in the set would be divided by 2, thus reducing one bit needed to store each data point in the set. If the scaling factor were raised to divide by 4, then two bits would be reduced for each data point in the set. When quantizing wavelet transformed images, the quantization factor can be adapted to suit a desired bit rate. The scalar factor or the index of a table where quantization mapping tables are used may be sent along with the compressed frame so that upon decode, the appropriate inverse quantization would be applied.

Where two successive frames are being inter-frame coded, and where the quantization level is different between them, the two frames cannot be subtracted directly (since each has a different possible range of values). Instead, an adjustment should be made so that the two quantized frames (data sets) are of equal scale. This adjustment may take the form of finding the difference between quantization level of one frame and another.

The difference equation due to change of quantization scalar or stepsize is $$\overline{w}_d(i, j) = \overline{w}'(i, j) - int\left(\frac{q(i, j)}{q'(i, j)}\overline{w}(i, j)\right)$$

where $\overline{w}(i, j)$ and $\overline{w}'(i, j)$ are the quantized coefficients in the previous and current frames, $q(i,j)$ and $q'(i,j)$ are the quantization scalar or stepsize applied in the previous and current frames, and $\overline{w}_d(i,j)$ is the difference quantized coefficient to be coded.

Figure 4:
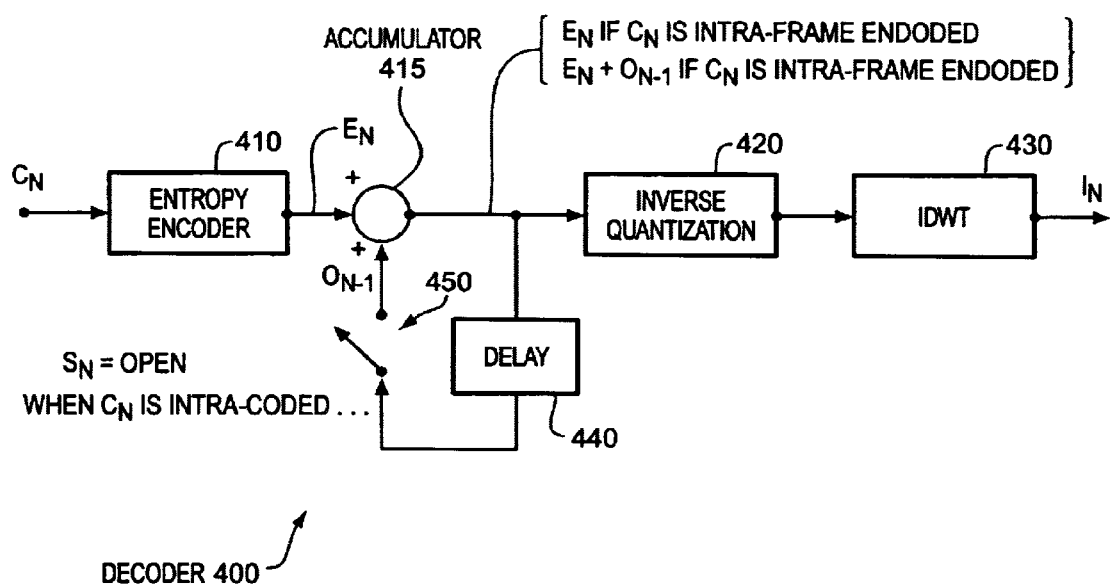
FIG. 4 illustrates a video decoder according to at least one embodiment of the invention.

FIG. 4 is a flow diagram of video decoding according to at least one embodiment of the invention.

A video decoder 400 can accept as input a compressed data set $C_N$ such as that output by the encoder 300 of FIG. 3 and recover an approximation of the input to the encoder $I'_N$. The original video frames approximately recovered can then be rendered to some device for display. Video decoder 400 first passes the coded (compressed) data set $C_N$ to an entropy decoder 410 which performs Huffman or similar decoding based upon whatever encoding strategy was used in the coding of the data. The entropy decoded data either represents a quantized wavelet difference frame between two successive frames (inter-frame coded frame) or a whole quantized wavelet frame (intra-frame coded frame).

A switching signal $S_N$ 450 is open when $C_N$ is an intra-frame encoded and compressed. In this case, the entropy decoded data set $E_N$ passes directly to an inverse quantization block 420. Inverse quantization block 420 mirrors the quantization block 320 of the encoder 300 in FIG. 3, and recovers the pre-quantized data value. If a scalar of 2 were used in the quantization, then each data value in compressed form is one-half the original. In such a case, the inverse quantization block 420 would multiply by 2 the data values received. If $C_N$ is intra-frame coding encoded, then $E_N$ would be inverse quantized by block 420 directly.

If $C_N$ is an inter-frame encoded, switching signal $S_N$ 450 is closed so that the previous frame can be added to the current difference (residue) frame such that a whole quantized, compressed image frame is re-constructed. For this purpose, a delay element 440 is connected via the closed switching signal $S_N$ to an accumulating node. The delay element 440 holds the previous output of the accumulator 415, which is either $Q_{N-1}$ if the previous cycle data set was intra-frame encoded, or $Q_{N-1}+Q_{N-2}$ if the previous frame was inter-frame encoded. The output ON of the accumulator 415 is then added to the current entropy decoded data set $E_N$, which is then passed to inverse quantization block 420. Thus, $O_N=Q_N$ if $C_N$ were the result of intra-frame encoding; or
$O_N=Q_N+O_{N-1}$ if $C_N$ were the result of inter-frame encoding.

After the output data set ON is inverse quantized and entropy decoded data, it then passes to an inverse DWT (IDWT) block 430. IDWT 430 takes the inverse quantized data in the form of sub-banded information and performs the reverse of a forward DWT. Referring back to FIG. 2, a set of four sub-bands would be inverse DWT transformed into a whole image frame. The whole image frame $I'_N$ is only an approximation of the original frame $I_N$ which was encoded by encoder 300 into the compressed form $C_N$.

Figure 5:
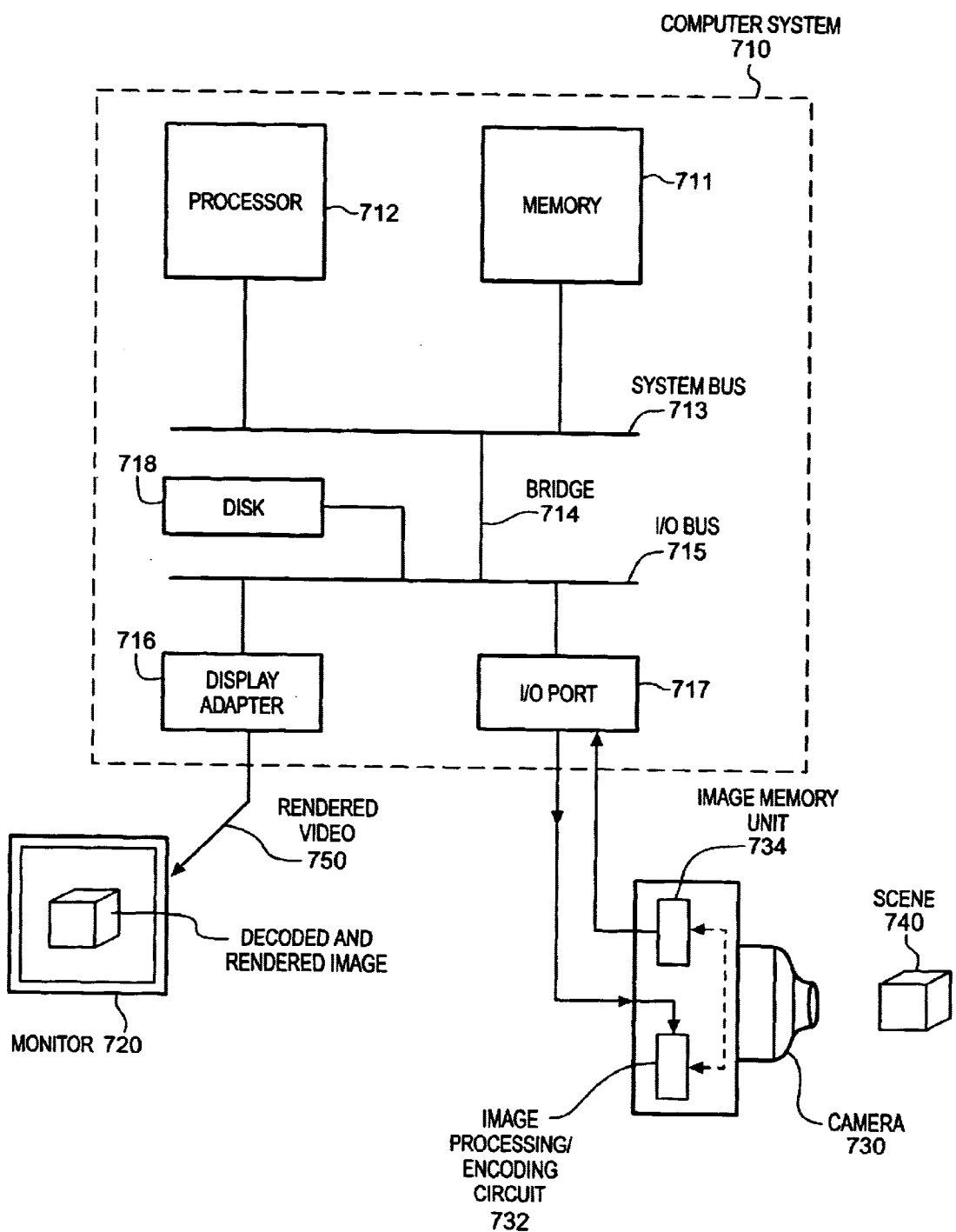
FIG. 5 is a system diagram of one embodiment of the invention.

FIG. 5 is a system diagram of one embodiment of the invention. Illustrated is a computer system 710, which may be any general or special purpose computing or data processing machine such as a PC (personal computer), coupled to a camera 730. Camera 730 may be a digital camera, digital video camera, or any image capture device or imaging system, or combination thereof and is utilized to capture a sequence of images of a scene 740. Essentially, captured images are processed by an image processing circuit 732 so that they can be efficiently stored in an image memory unit 734, which may be a ROM, RAM or other storage device such as a fixed disk. In some digital video cameras a sequence of images are stored first and downloaded later. This allows the camera 730 to capture the next object/scene quickly without additional delay. However, in the case of digital video camera, especially one used for live video conferencing, it is important that images not only be quickly captured, but quickly processed and transmitted out of camera 730. The invention in various embodiments, particularly in scaling operation, is well-suited to providing good fast throughput to other parts of the image processing circuit 732 so that the overall speed of transmitting image frames is increased.

Video frame compression and encoding may be carried out within the image processing circuit 732 in one embodiment of the invention. The process of DWT based video encoding may be applied to any image sequence whether captured by camera 730 or obtained elsewhere. Since the inverse and forward DWT are essentially filtering operations, one of ordinary skill in the art may program computer system 710 to perform DWT based up-sampling. This may be achieved using a processor 712 such as the Pentium® processor (a product of Intel Corporation) and a memory 711, such as RAM, which is used to store/load instructions, addresses and result data as needed. Thus, in an alternative embodiment, video encoding/decoding may be achieved in software application running on computer system 710 rather than directly in hardware. The application(s) used to generate encoded video data after download from camera 730 may be from an executable compiled from source code written in a language such as C++. The instructions of that executable file, which correspond with instructions necessary to scale the image, may be stored to a disk 718, such as a floppy drive, hard drive or CD-ROM, or memory 711. Further, the various embodiments of the invention may be implemented onto a video display adapter or graphics processing unit that provides video encoding and/or decoding.

Computer system 710 has a system bus 713 which facilitates information transfer to/from the processor 712 and memory 711 and a bridge 714 which couples to an I/O bus 715. I/O bus 715 connects various I/O devices such as a display adapter 716, disk 718 and an I/O port 717, such as a serial port. Many such combinations of I/O devices, buses and bridges can be utilized with the invention and the combination shown is merely illustrative of one such possible combination.

When video, such as video of a scene 740, is captured by camera 730, it is sent to the image processing circuit 732. Image processing circuit 732 consists of ICs and other components which can execute, among other functions, the encoding of the captured video by using DWT. The video encoding procedure, as described earlier, may utilize image memory unit to store one frame of the scene 740 captured by the camera 730 instead of a delay element. Further, this same memory unit can be used to store the intermediate data results from quantization, entropy encoding, forward DWT or the inverses of these operations. When the user or application desires/requests a download of video, the encoded and compressed frame data stored in the image memory unit is transferred from image memory unit 734 to the I/O port 717. I/O port 717 uses the bus-bridge hierarchy shown (I/O bus 715 to bridge 714 to system bus 713) to temporarily store the compressed/encoded frame data into memory 711 or, optionally, disk 718.

The encoded video maybe decoded on computer system 710 by suitable application software (or hardware), which may utilize processor 712 for its processing. The video sequence may then be reconstructed and rendered visually using a display adapter 716 into a rendered video 750. The decoded video will be substantially of the same quality as the original pre-encoded sequence. In a video conferencing application, the video data in its compressed and encoded form may be communicated over a network or communication system to another node or computer system in addition to or exclusive of computer system 710 so that a video conferencing session may take place. Since encoding and compression are already achieved on-camera in one embodiment of the invention, it may be possible to implement a communication port in camera 730 that allows the image data to be transported directly to the other node(s) in a video conferencing session. Wherever a user of computer system 710 also desires to see his own scene on monitor 720, video that is encoded may be sent both to computer system 710 and transported over a network to other nodes. As discussed earlier, the decoded and rendered video will have more visually accurate features than in typical encoding/decoding of video due to the properties of the DWT. The end result will be a higher quality and quickly decodable and rendered video 750 that displayed onto monitor 720 or other nodes in a video conferencing session as compared with even typical up-sampling methods.

In the above description, where video encoding is referred to, decoding may also be similarly achieved/implemented, as shown in FIGS. 3 and 4 even though not expressly stated.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method comprising:
   intra-frame coding a first sequence of video data using Discrete Wavelet Transforms;
   activating a signaling switch; and
   inter-frame coding a second sequence of video data using Discrete Wavelet Transforms, said second sequence of data interspersed with said first sequence.

2. A method according to claim 1 wherein said intra-frame coding includes:
   performing a two-dimensional Discrete Wavelet Transform (DWT) upon one frame in said first sequence of data generating a set of DWT coefficients therefrom; and
   performing quantization of said set of DWT coefficients, generating a current set of quantized data therefrom.

3. A method according to claim 2 wherein said intra-frame coding further includes:
   entropy encoding said quantized data set, said entropy encoding resulting in a intra-frame encoded data set.

4. A method according to claim 2 wherein said inter-frame coding includes:
   performing a two-dimensional Discrete Wavelet Transform (DWT) upon one frame in said first sequence of data generating a set of DWT coefficients therefrom; and
   performing quantization of said set of DWT coefficients, generating a set of quantized data therefrom.

5. A method according to claim 4 wherein said inter-frame coding further includes:
   generating a residue data set from said current quantized data set and from a quantized data set resulting from a previous frame.

6. A method according to claim 5 wherein said generating of a residue data set includes:
   delaying said quantized data set resulting from a previous frame until said current quantized data set is generated; and
   subtracting said quantized data set resulting from a previous frame from said current quantized data set, said difference constituting the residue data set.

7. A method according to claim 6 wherein said inter-frame coding further includes:
   entropy encoding said residue data set, said entropy encoding resulting in a inter-frame coded data set.

8. A method according to claim 6 wherein said delaying is controlled by a signaling switch.

9. A method according to claim 1 further comprising:
   decoding said inter-frame coded and inter-frame coded data arranged in a sequence of frames.

10. A method according to claim 9 further wherein said decoding includes:
    entropy decoding a current frame of said data, said entropy decoded data constituting intermediate output data if said frame was intra-frame encoded.

11. A method according to claim 10 wherein if said frame is inter-frame encoded, adding intermediate output data generated by a previous frame with said entropy decoded data from said current frame, the sum constituting said intermediate output data.

12. A method according to claim 11 wherein said decoding further includes:
    inverse quantizing said intermediate output data; and
    performing an inverse two-dimensional Discrete Wavelet Transform upon said inverse quantized intermediate output data, the result constituting an approximation of the video frame prior to encoding.

13. An apparatus comprising a computer-readable medium having instructions stored thereon which when executed causes:

intra-frame coding a first sequence of video data using Discrete Wavelet Transforms;

activating a signaling switch; and inter-frame coding a second sequence of video data using Discrete Wavelet Transforms, said second sequence of data interspersed with said first sequence.

14. An apparatus according to claim 13 which further causes:

decoding said intra-frame coded and inter-frame coded data.

15. An apparatus comprising:

a Discrete Wavelet Transform (DWT) module that transforms by discrete wavelets data of an input video frame;

a quantization module coupled to said DWT module, that quantizes said transformed data;

a subtraction unit coupled to receive said quantized data from a current frame and one of quantized data from a previous frame and a null input, wherein said subtraction unit generates residue data therefrom;

a signaling switch that sends said quantized data from a previous frame to said subtraction unit when said switch is activated; and an entropy encoder module coupled to entropy encode said residue data.

16. An apparatus according to claim 15 wherein said subtraction unit subtracts LL sub-bands to control a rate of quantization.

17. An encoder comprising:

a Discrete Wavelet Transform (DWT) module that transforms by discrete wavelets data of an input video frame;

a quantization module coupled to said DWT module that quantizes said transformed data;

a subtraction unit coupled to receive said quantized data from a current frame and one of quantized data from a previous frame and a null input, wherein said subtraction unit generates residue data therefrom; and a signaling switch that sends said quantized data from a previous frame to said subtraction unit when said signaling switch is activated.

18. An encoder according to claim 17, wherein said encoder performs intra-frame coding of said residue data when said signaling switch is deactivated.

19. An encoder according to claim 17, wherein said encoder performs inter-frame coding of said residue data when said signaling switch is activated.

20. A decoder comprising:

an entropy decoder module coupled to entropy decode a data set;

an accumulator unit coupled to receive said entropy decoded data and one of entropy decoded data from a previous frame and a null input, wherein said accumulator unit generates a whole quantized frame of data;

a signaling switch that sends said entropy decoded data from a previous frame to said accumulator unit when said signaling switch is activated;

an inverse quantization module that inverse quantizes said whole quantized frame of data; and an inverse Discrete Wavelet Transform module that transforms by inverse discrete wavelets said whole quantized frame of data into a whole image frame.

21. A system comprising:

an encoder having a first signaling switch, adapted to send quantized data from a previous frame to a subtraction unit when said first signaling switch is activated; and a decoder having a second signaling switch, adapted to send entropy decoded data from a previous frame to an accumulator unit when said second signaling switch is activated.

22. A system according to claim 21 wherein said entropy encoder module performs inter-frame encoding when said first signaling switch is deactivated.

23. A system according to claim 21 wherein said entropy encoder module performs intra-frame encoding when said first signaling switch is activated.

24. A system according to claim 21 wherein said encoder further comprises a Discrete Wavelet Transform (DWT) module that transforms by discrete wavelets data of an input image frame.

25. A system according to claim 24 wherein said encoder further comprises a quantization module coupled to said DWT module that quantizes said transformed data.

26. A system according to claim 25 wherein said encoder further comprises a subtraction unit coupled to receive said quantized data from a current frame and one of quantized data from said previous frame and a null input, wherein said subtraction unit generates residue data therefrom.

27. A system according to claim 26 wherein said encoder further comprises an entropy encoder module that entropy encodes said residue data.

28. A system according to claim 27 wherein said decoder further comprises an entropy decoder module that decodes said entropy encoded data.

29. A system according to claim 28 wherein said decoder further comprises an accumulator unit coupled to receive said entropy decoded data and one of entropy decoded data from said previous frame and a null input, wherein said accumulator unit generates a reconstructed quantized frame of data.

30. A system according to claim 29 wherein said decoder further comprises an inverse quantization module that inverse quantizes said reconstructed quantized frame of data.

31. A system according to claim 30 wherein said decoder further comprises an inverse Discrete Wavelet Transform module adapted to transform by inverse discrete wavelets said reconstructed quantized frame of data into an output image frame.

* * * * *